(12) United States Patent
Moruzzi et al.

(10) Patent No.: US 12,734,746 B2
(45) Date of Patent: Sep. 15, 2026

(54) TECHNIQUES FOR GENERATING COMPOSITE STRUCTURES THAT COMBINE METAL AND POLYMER COMPOSITIONS

(71) Applicant: Augmenta Inc., Toronto (CA)

(72) Inventors: Massimiliano Moruzzi, Rockford, IL (US); Francesco Iorio, Toronto (CA)

(73) Assignee: XABA INC., Toronto (CA)

( * ) Notice: Subject to any disclaimer, the term of this patent is extended or adjusted under 35 U.S.C. 154(b) by 747 days.

(21) Appl. No.: 18/150,765

(22) Filed: Jan. 5, 2023

(65) Prior Publication Data

US 2023/0211545 A1 Jul. 6, 2023

Related U.S. Application Data

(60) Provisional application No. 63/297,022, filed on Jan. 6, 2022.

(51) Int. Cl.

| | |
|---|---|
| ***B29C 64/393*** | (2017.01) |
| ***B29C 64/112*** | (2017.01) |
| ***B29C 64/118*** | (2017.01) |
| ***B29C 64/20*** | (2017.01) |
| ***B33Y 10/00*** | (2015.01) |
| ***B33Y 50/02*** | (2015.01) |
| *B29K 105/04* | (2006.01) |
| *B33Y 30/00* | (2015.01) |

(Continued)

(52) U.S. Cl.
CPC .......... *B29C 64/112* (2017.08); *B29C 64/118* (2017.08); *B29C 64/20* (2017.08); *B29C 64/393* (2017.08); *B33Y 10/00* (2014.12); *B29K 2105/045* (2013.01); *B33Y 30/00* (2014.12); *B33Y 40/00* (2014.12); *B33Y 50/02* (2014.12); *B33Y 70/00* (2014.12); *B33Y 80/00* (2014.12)

(58) Field of Classification Search
CPC ..... B29C 64/112; B29C 64/118; B29C 64/20; B29C 64/393; B29K 2105/045; B33Y 10/00; B33Y 30/00; B33Y 40/00; B33Y 50/02; B33Y 70/00; B33Y 80/00
See application file for complete search history.

(56) References Cited

U.S. PATENT DOCUMENTS

2005/0173045 A1 8/2005 Hayes
2008/0241455 A1 10/2008 DiNello et al.
(Continued)

FOREIGN PATENT DOCUMENTS

CN 105500712 B 1/2018
EP 3 046 749 B1 2/2021
(Continued)

OTHER PUBLICATIONS

Partial Search Report for Application No. PCT/US2023/060268 dated Mar. 22, 2023.

(Continued)

*Primary Examiner* — Yuhui R Pan
(74) *Attorney, Agent, or Firm* — Artegis Law Group, LLP

(57) ABSTRACT

A method for fabricating a multi-material structure includes: forming a structural member with at least one open-cell void that is formed on a surface of the structural member; depositing a first portion of a polymeric skin on the surface; and depositing a second portion of the polymeric skin within the at least one open-cell void.

20 Claims, 16 Drawing Sheets

(51) Int. Cl.

| | |
|---|---|
| *B33Y 40/00* | (2020.01) |
| *B33Y 70/00* | (2020.01) |
| *B33Y 80/00* | (2015.01) |

(56) References Cited

U.S. PATENT DOCUMENTS

| | | | | |
|---|---|---|---|---|
| 2012/0141769 | A1 | 6/2012 | Weber et al. | |
| 2014/0120364 | A1 | 5/2014 | Peca et al. | |
| 2015/0145169 | A1* | 5/2015 | Liu | B33Y 10/00 264/308 |
| 2015/0251356 | A1* | 9/2015 | Batchelder | G05B 19/4099 700/98 |
| 2016/0002468 | A1 | 1/2016 | Heikkila et al. | |
| 2016/0075089 | A1 | 3/2016 | Duro Royo et al. | |
| 2016/0152358 | A1* | 6/2016 | Divine | G05B 19/4099 206/525 |
| 2017/0136697 | A1 | 5/2017 | Kia et al. | |
| 2018/0104917 | A1 | 4/2018 | Jin | |
| 2018/0243981 | A1* | 8/2018 | Manee | B29C 64/118 |
| 2018/0321659 | A1 | 11/2018 | Dasappa et al. | |
| 2020/0130256 | A1 | 4/2020 | Debora et al. | |
| 2020/0207024 | A1* | 7/2020 | Morris | B29C 70/38 |
| 2020/0290271 | A1 | 9/2020 | Carlson et al. | |
| 2021/0197457 | A1* | 7/2021 | Broach | B23K 20/22 |

FOREIGN PATENT DOCUMENTS

| | | | |
|---|---|---|---|
| WO | 2015/042422 | A1 | 3/2015 |
| WO | 2018/045120 | A1 | 3/2018 |

OTHER PUBLICATIONS

Partial Search Report for Application No. PCT/US2023/060266 dated Apr. 24, 2023.

International Search Report for Application No. PCT/US2023/060268 dated May 3, 2023.

Non Final Office Action received for U.S. Appl. No. 18/150,763, dated May 20, 2025, 18 pages.

International Search Report for Application No. PCT/US2023/060266 dated Jun. 1, 2023.

Notice of Allowance received for U.S. Appl. No. 18/150,763, dated Sep. 11, 2025, 5 pages.

* cited by examiner

| Geometric Control Point | X Location | Y Location | Z Location | Knot Vector | Weight |
|---|---|---|---|---|---|
| 501 | 511 | 512 | 513 | 502 | 503 |
| 501 | 511 | 512 | 513 | 502 | 503 |
| 501 | 511 | 512 | 513 | 502 | 503 |
| 501 | 511 | 512 | 513 | 502 | 503 |
| 501 | 511 | 512 | 513 | 502 | 503 |
| 501 | 511 | 512 | 513 | 502 | 503 |
| 501 | 511 | 512 | 513 | 502 | 503 |
| 501 | 511 | 512 | 513 | 502 | 503 |
| 501 | 511 | 512 | 513 | 502 | 503 |
| 501 | 511 | 512 | 513 | 502 | 503 |
| 501 | 511 | 512 | 513 | 502 | 503 |
| ⋮ | ⋮ | ⋮ | ⋮ | ⋮ | ⋮ |

| Geometric Control Point | X Location | Y Location | Z Location | Knot Vector | Weight | Process Parameter 1 | . . . | Process Parameter N |
|---|---|---|---|---|---|---|---|---|
| 701 | 711 | 712 | 713 | 702 | 703 | 720 | | 720 |
| 701 | 711 | 712 | 713 | 702 | 703 | 720 | | 720 |
| 701 | 711 | 712 | 713 | 702 | 703 | 720 | | 720 |
| 701 | 711 | 712 | 713 | 702 | 703 | 720 | | 720 |
| 701 | 711 | 712 | 713 | 702 | 703 | 720 | | 720 |
| 701 | 711 | 712 | 713 | 702 | 703 | 720 | | 720 |
| 701 | 711 | 712 | 713 | 702 | 703 | 720 | | 720 |
| 701 | 711 | 712 | 713 | 702 | 703 | 720 | | 720 |
| 701 | 711 | 712 | 713 | 702 | 703 | 720 | | 720 |
| 701 | 711 | 712 | 713 | 702 | 703 | 720 | | 720 |
| 701 | 711 | 712 | 713 | 702 | 703 | 720 | | 720 |
| ⋮ | ⋮ | ⋮ | ⋮ | ⋮ | ⋮ | ⋮ | | ⋮ |

TECHNIQUES FOR GENERATING COMPOSITE STRUCTURES THAT COMBINE METAL AND POLYMER COMPOSITIONS

CROSS-REFERENCE TO RELATED APPLICATIONS

This application claims priority benefit of the United States Provisional Patent Application titled, "TECHNIQUES FOR COMPOSITE STRUCTURES THAT COMBINE METAL AND POLYMER COMPOSITIONS" filed on Jan. 6, 2022 and having Ser. No. 63/297,022. The subject matter of this related application is hereby incorporated herein by reference.

BACKGROUND

Field of the Various Embodiments

The various embodiments relate generally to additive manufacturing and, more specifically, to techniques for generating composite structures that combine metal and polymer compositions.

Description of the Related Art

Additive manufacturing, also known as three-dimensional (3D) printing, is the construction of a three-dimensional object by sequentially depositing one material layer at a time via a special printing machine to build out the three-dimensional object or by adding material to build out the three-dimensional object via some other technique. In many additive manufacturing processes, the material layers can be deposited, joined, or solidified under computer control that is based on a computer-aided design (CAD) or other a digital 3D model to form a multi-material structure. Because multi-material structures can have superior physical properties, they are tremendously important in applications where strong, lightweight mechanical systems are needed, such as automotive, aerospace, and construction applications. Further, multi-material structures frequently fulfill multiple functions, such as when a given structure serves as a structural component that also is corrosion- and environmental agent-resistant.

One drawback to additive manufacturing is that there is generally poor mechanical coupling between the different materials that are included in a multi-material component. For example, 3D-printed polymers that are formed on the surfaces of dissimilar substrates (such as a metals or ceramics) are known to have poor adhesion to those surfaces. Consequently, the different materials making up a multi-material component behave as separate structural elements as opposed to contributing collectively to the mechanical properties of the overall component. As a result, the multi-material component cannot act as a monolithic structure in response to stresses, impacts, and the like. For example, a polymeric skin that is 3D printed onto a surface of a metallic structural member may closely conform to the surface of the structural member, but may not contribute to the rigidity of the metallic structural member due to poor or nonexistent mechanical coupling between the polymeric skin and the surface of the metallic structural member. In such a situation, the polymeric skins may add little or no structural strength or rigidity to the metallic structural member.

Another drawback to additive manufacturing is that the polymeric materials typically employed in 3D-printing can be highly sensitive to the way in which those materials are deposited. For example, 3D-printer nozzle velocity, deposition temperature, deposition rate, and direction of deposition can all significantly affect the physical properties of a 3D-printed polymer. As a result, the physical properties of 3D-printed polymers can be undesirably variable and difficult to predict, which can be problematic when such polymers are included in components that are load-bearing and/or receive impacts. These issues can be particularly prevalent for fiber-reinforced polymers, which can be highly anisotropic.

As the foregoing illustrates, what is needed in the art are more effective additive manufacturing techniques that involve polymers and metallic substrates.

SUMMARY

A multi-material structure includes: a structural member that includes an isotropic material and at least one open-cell void formed in the isotropic material; and a skin that includes a polymetric material and is disposed on a surface of the structural member and within the at least one open-cell void.

A multi-material structure includes: a structural member that includes an isotropic material; and a skin that includes a polymetric material, is disposed on a surface of the structural member, and has at least one closed-cell void that is disposed on the surface of the structural member and contains an adhesive material.

A method for fabricating a multi-material structure, the method comprising: forming a structural member with at least one open-cell void that is formed on a surface of the structural member; depositing a first portion of a polymeric skin on the surface; and depositing a second portion of the polymeric skin within the at least one open-cell void.

A method for fabricating a multi-material structure, the method comprising: forming a structural member with a surface; forming a polymeric skin on the surface by depositing a first portion of a polymeric material on a first portion of the surface; forming at least one open-cell void on the surface by depositing a second portion of a polymeric material proximate a second portion of the surface; and injecting an adhesive into the at least one closed-cell void At least one technical advantage of the disclosed techniques relative to the prior art is that the disclosed techniques enable the fabrication of a multi-material structure that has improved mechanical coupling between different materials included in the muti-material structure relative to what can be achieved using conventional techniques. Consequently, the multi-material structures generated using the disclosed techniques behave mechanically as single monolithic members instead of collections of separate discrete elements. Another technical advantage of the disclosed techniques is that 3D-printed polymers can be deposited or formed with predictable physical properties. Consequently, when generating a multi-material structure using the disclosed techniques, anisotropic, 3D-printed polymers can be formed and oriented to enhance the strength and/or rigidity of the multi-material structure relative to what can be achieved using conventional techniques. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

Multi-Material Hybrid Structure

Figure 1:
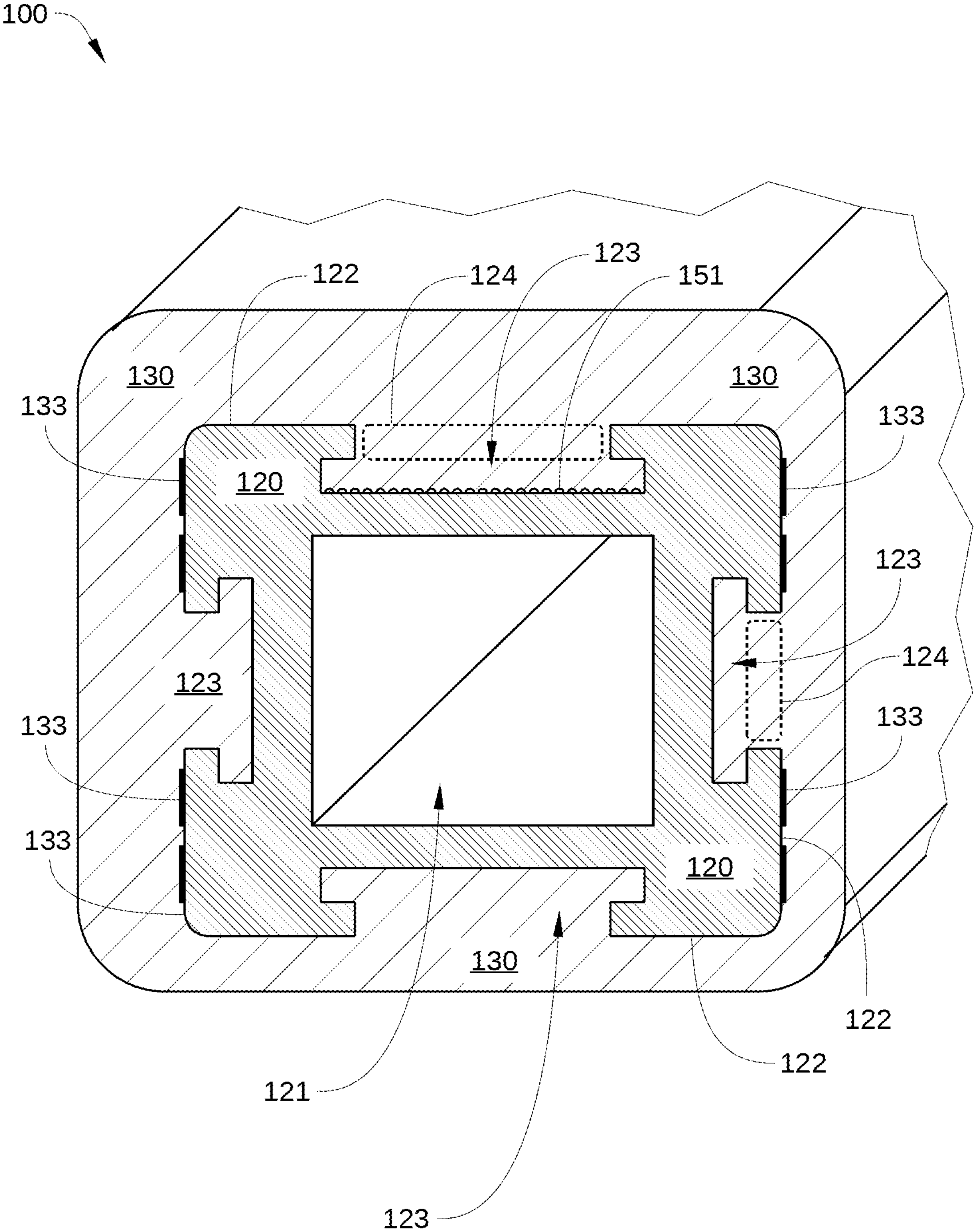
FIG. 1 schematically illustrates a cross-sectional view of a multi-material structure, according various embodiments.

FIG. 1 schematically illustrates a cross-sectional view of a multi-material structure 100, according to various embodiments. Multi-material structure 100 can be any structure or component of a structure that is fabricated via an additive manufacturing process and include multiple materials. In the embodiment depicted in FIG. 1, multi-material structure 100 is a structural member that includes an endoskeleton 120 and a polymeric skin 130 that is formed on a surface 122 of endoskeleton 120. According to various embodiments, polymeric skin 130 is mechanically and/or chemically (e.g., via adhesive) coupled to endoskeleton 120, so that multi-material structure 100 behaves as a single monolithic structure, rather than as an assembly of separate parts that are discretely joined together by fasteners, welds, and/or the like. Thus, phenomenon acting on multi-material structure 100, such as physical, thermal, and/or chemical stresses, affect the multi-material components of multi-material structure 100 simultaneously. For example, in the embodiment illustrated in FIG. 1, polymeric skin 130 and endoskeleton 120 each contribute simultaneously to the shock absorption of multi-material structure 100 when a physical impact is received thereby. In other examples, polymeric skin 130 and endoskeleton 120 each contribute simultaneously to how multi-material structure 100 responds to heat transfer, a bending or torsion load, and the like. By contrast, in an assembly of separate parts that are discretely joined together, the effects of a phenomenon acting on the assembly (e.g., force, thermal energy, vibration, and the like) passes through points of concentration from one element of the assembly to the other, such as bolts, welds, and the like. Thus, such an assembly generally behaves as a collection of discrete parts and not as a monolithic component.

According to various embodiments, multi-material structure 100 behaves as a single monolithic structure in response to a certain phenomenon, such as physical, thermal, and/or chemical stresses. In the embodiment illustrated in FIG. 1, polymeric skin 130 is mechanically coupled to endoskeleton 120 via one or more open-cell voids 123. Open-cell voids 123 are formed on one or more surfaces of endoskeleton 120 and contain a portion of polymeric skin 130 as shown. In some embodiments, polymeric skin 130 is further chemically coupled to endoskeleton 120 via an adhesive (not shown) that is disposed in one or more closed-cell voids 133.

Endoskeleton 120 is a structural member or other rigid element of multi-material structure 100, and includes a central cavity 121, and one or more open-cell voids 123. In some embodiments, endoskeleton 120 can be composed of a metallic, polymeric, wood, ceramic, or composite material. In some embodiments, endoskeleton 120 is comprised of an isotropic material, such as a metal or ceramic. In some embodiments, endoskeleton 120 is formed via any technically feasible manufacturing technique or techniques, such as extrusion, pultrusion, rolling, bending, welding, forging, stamping, and/or the like. In the embodiment illustrated in FIG. 1, endoskeleton 120 is configured as an extruded metallic profile, and open-cell voids 123 can be formed via the extrusion process. In other embodiments, open-cell voids 123 can be formed via separate processes, such as machining, welding, and the like. Thus, in such embodiments, open-cell voids 123 are added to endoskeleton 120.

Open-cell voids 123 can be concave features that are formed on one or more surfaces of endoskeleton 120 and configured so that a portion of polymeric skin 130 can be deposited therein when polymeric skin 130 is formed on endoskeleton 120. Thus, each open-cell void 123 includes at least one opening 124 through which a portion of polymeric skin 130 can be deposited. In the embodiment illustrated in FIG. 1, open-cell voids 123 are formed on four surfaces of endoskeleton 120. In other embodiments, open-cell voids 123 are not formed on all surfaces of endoskeleton 120, and instead are formed on one, two, or three surfaces of endoskeleton 120.

In some embodiments, one or more of open-cell voids 123 includes a roughened surface, such as surface 151 within the open-cell void 123 formed on an upper surface of endoskeleton 120. In such embodiments, the increased surface roughness of surface 151 enhances the mechanical coupling of the portion of polymeric skin 130 that is disposed within the associated open-cell void 123.

In some embodiments, endoskeleton 120 includes one or more cavities, such as central cavity 121. In some embodiments, such cavities may remain hollow upon completion of the fabrication of multi-material structure 100. In other embodiments, such cavities may be filled with a different material than that of endoskeleton 120. For example, in some embodiments, central cavity 121 can be filled completely or partially with a volumetric material or structure, such as a regular structure (e.g. a 3D-printed honeycomb) and/or a stochastic structure (e.g., a foam). In such embodiments, the stochastic structure can be added via one or more holes (not shown in FIG. 1) drilled or otherwise formed in endoskeleton 120 or through endoskeleton 120 and polymeric skin 130.

Polymeric skin 130 can be any 3D printed polymer that is deposited, printed, and/or formed on one or more surfaces of endoskeleton 120. The polymeric material that forms polymeric skin 130 can include any technically feasible polymer that can be deposited via a 3D-printing process, such as fused deposition modeling (FDM). FDM, also known as fused filament fabrication (FFF), deposits a thermoplastic layer by extruding thermoplastic filaments or pellets, such as acrylonitrile butadiene styrene (ABS) or polylactic acid (PLA), through a heated nozzle. The melted material is applied to a substrate layer by layer to a build a structure, such as polymeric skin 130. Each layer is laid down one at a time until the part is complete.

Examples of suitable polymeric materials for use in polymeric skin 130 include ABS, PLA, polyetherimide (PEI) (also referred to as ULTEM®), polyether ether ketone (PEEK), and/or other thermoplastics. In some embodiments, the polymeric material includes a fiber-reinforced polymer. In such embodiments, certain fibers are included in the polymeric material, such as carbon fiber, glass fiber, natural fibers, and/or the like. In such embodiments, the reinforcing fiber can be a microfiber that is mixed into the polymer before or during the deposition process or a continuous fiber that is, for example, fed from a spool during the deposition process.

In some embodiments polymeric skin 130 is formed with closed-cell voids 133 that contain or are filled with an adhesive (not shown in FIG. 1 for clarity). In such embodiments, the adhesive further mechanically couples polymeric skin 130 to endoskeleton 120, so that polymeric skin 130 does not behave like a separate structural member from endoskeleton 120. Instead, the additional mechanical coupling provided by adhesive disposed in closed-cell voids 133 enables polymeric skin 130 to respond in conjunction with endoskeleton 120, for example in response to an impact, a bending load, a torsional load, thermal stresses, and the like. In such embodiments, the adhesive can be injected into closed-cell voids 133 via one or more injection holes (not shown in FIG. 1) drilled or otherwise formed in polymeric skin 130, for example in a process subsequent to the formation of polymeric skin 130. Thus, in such embodiments, closed cell voids 133 may initially be formed during the deposition of polymeric skin 130 and have no openings. One embodiment of a closed cell void 133 and associated injection holes is described below in conjunction with FIG. 2.

Figure 2:
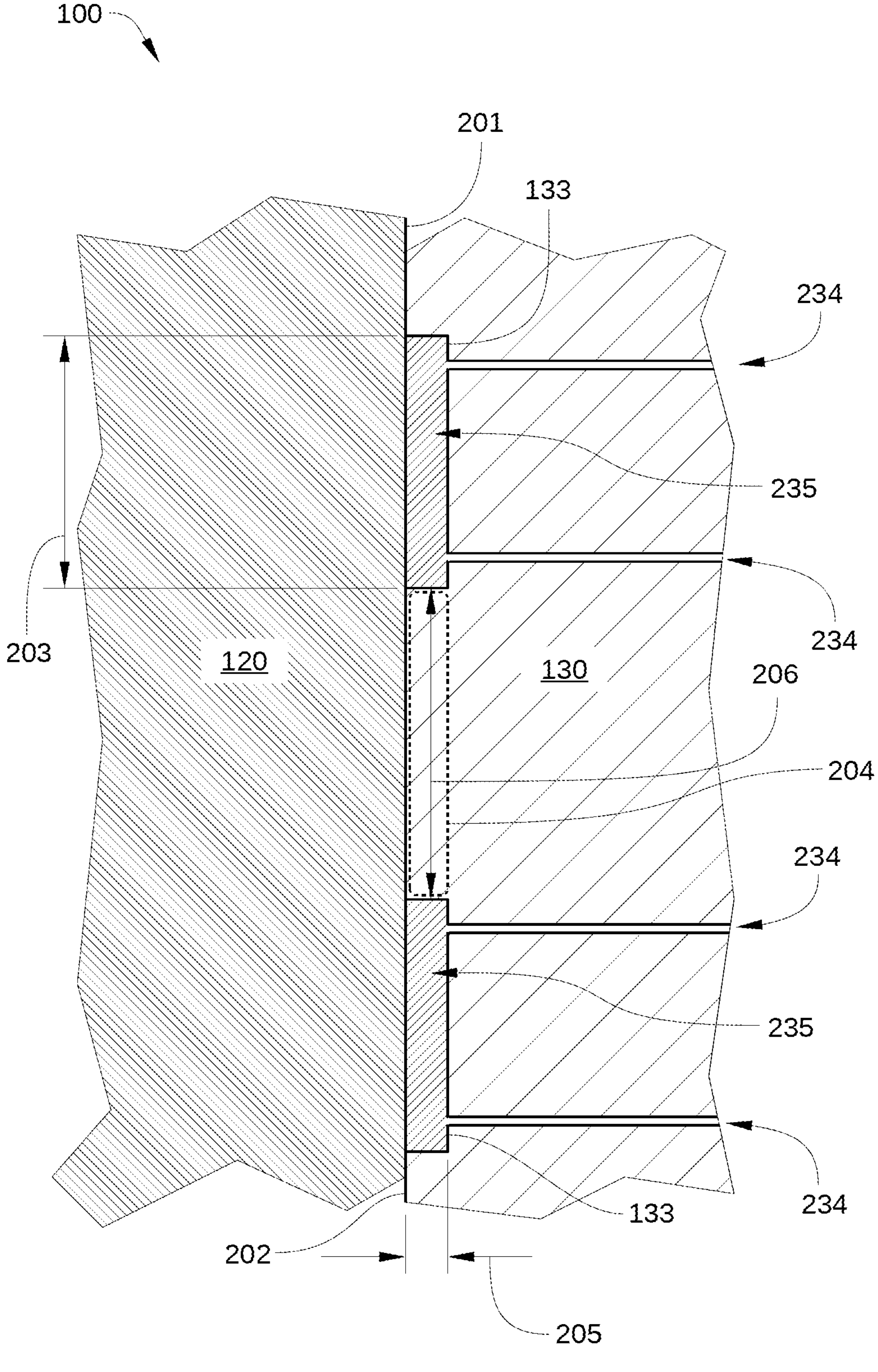
FIG. 2 is a more detailed illustration of the multi-material structure of FIG. 1, according to various embodiments.

FIG. 2 is a more detailed illustration of multi-material structure 100 of FIG. 1, according to various embodiments. As shown, closed cell voids 133 are disposed between an external surface 201 of endoskeleton 120 and an internal surface 202 of polymeric skin 130. As noted above, in some embodiments, polymeric skin 130 is deposited via a 3D-printing process so that closed-cell void 133 is formed at specified locations between external surface 201 and internal surface 202. In some embodiments, the locations of closed-cell voids 133 are selected to correspond to areas of external surface 201 where relatively large relative motion between endoskeleton 120 and polymeric skin 130 is predicted under certain conditions and/or loads. Alternatively or additionally, in some embodiments, the locations of closed cell voids 133 are selected to correspond to areas of external surface 201 where high strain of endoskeleton 120 and polymeric skin 130 is predicted under certain conditions and/or loads.

In some embodiments, multi-material structure 100 includes one or more injection holes 234 for the injection of an adhesive 235 into closed-cell voids 133. In some embodiments, each closed-cell void 133 is coupled to two or more injection holes 234, so that a suitable adhesive 235 can be injected via one injection hole and air can escape via a different injection hole 234.

In some embodiments, to avoid collapse of closed-cell voids 133 during deposition of polymeric skin 130, a width 203 of each closed-cell void 133 is limited. In such embodiments, the collapse of closed-cell voids 133 is avoided by providing support regions 204 (dashed line) of polymeric skin 130 that are disposed between closed-cell voids 133 and in contact with external surface 201. The size 206 of support regions 204 can be selected by one of skill in the art based on various factors, including rigidity of polymeric skin 130 as deposited on external surface 201, width 203 of closed-cell voids 133, a depth 205 of closed-cell voids 133, an expected physical load, an expected thermal load, and/or the like.

In the embodiments described above in conjunction with FIGS. 1 and 2, multi-material structure 100 includes both open-cell voids 123 and closed-cell voids 133. In some embodiments, multi-material structure 100 includes open-cell voids 123 in endoskeleton 120 but no closed-cell voids 133 in polymeric skin 130. Alternatively, in some embodiments, multi-material structure 100 includes closed-cell voids 133 in polymeric skin 130 but no open-cell voids 123 in endoskeleton 120.

Multi-Material Fabrication Process

According to various embodiments, polymeric skin 130 is deposited on and mechanically coupled to endoskeleton 120 via an additive manufacturing process in which specific geometric locations within multi-material structure 100 are associated with specific values of one or more process parameters. In some embodiments, each specific geometric location is associated with specific values of process parameters for formation of polymeric skin 130 via a data structure, such as an extended non-uniform rational B-spline (NURBS). In the embodiments, the data structure can include a NURBS that describes the geometrical configuration of the various materials included in multi-material structure 100, such as the various different layers of 3D-printed materials multi-material structure 100. In addition the data structure includes an extended NURBS that associates each of a plurality of geometric locations with specific values for one or more process parameters (for example, formation of polymeric skin 130). Thus, the extended NURBS does not merely describe the geometry of multi-material structure 100. In addition, the extended NURBS enables specific manufacturing processes to be performed in the formation of multi-material structure 100, where each manufacturing process includes specified values for various process parameters at a plurality of geometrical locations within multi-material structure 100. Examples of such process parameters include deposition temperature, material flowrate, deposition nozzle velocity and acceleration, and the like. Embodiments of such an additive manufacturing process are described below in conjunction with FIGS. 3-8.

Figure 3:
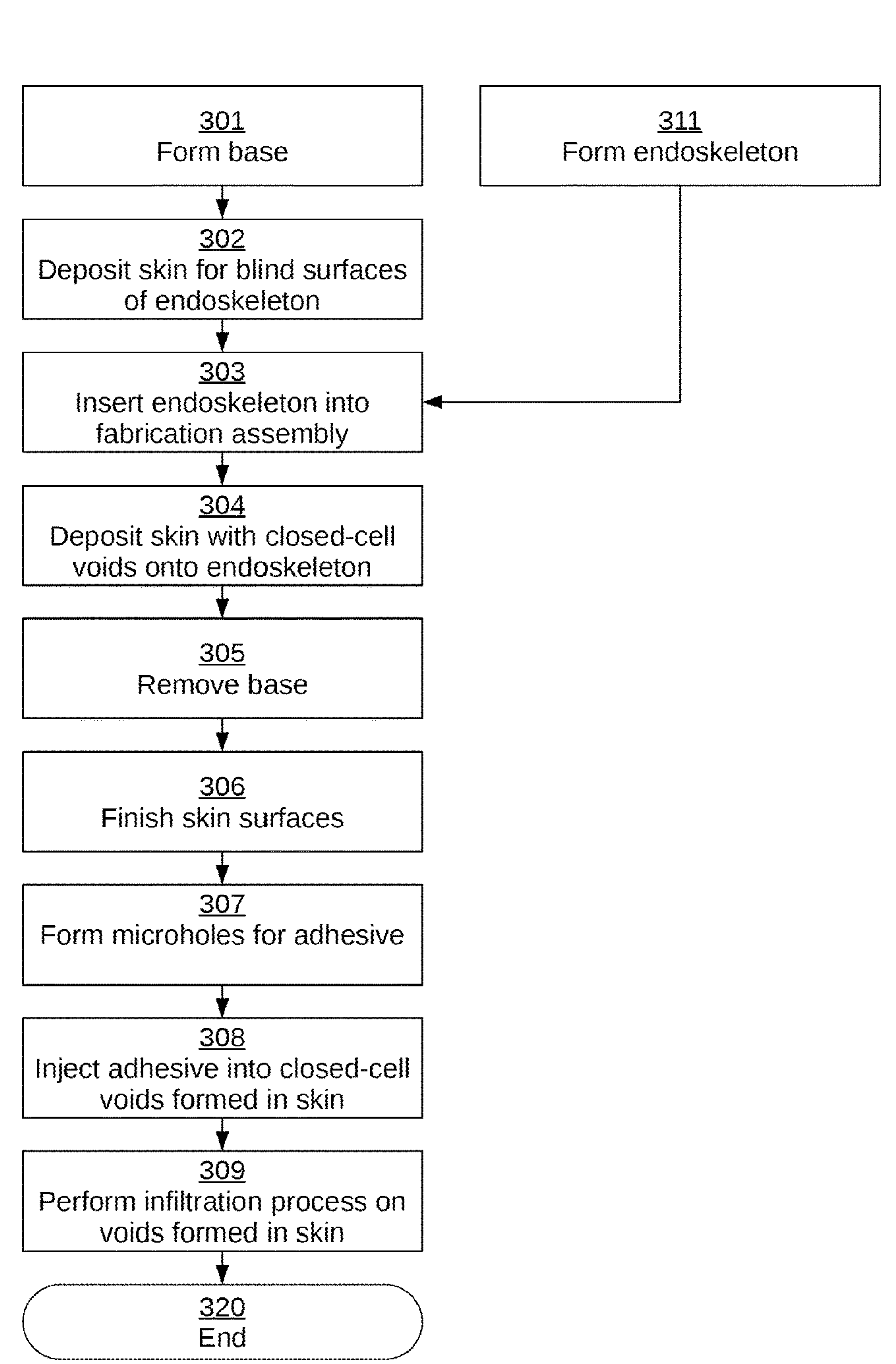
FIG. 3 sets forth a flowchart of method steps for fabricating a multi-material structure, according to various embodiments.

FIG. 3 sets forth a flowchart of method steps for fabricating a multi-material structure, according to various embodiments. FIGS. 4A-4G depict the fabrication of multi-material structure 100, according to various embodiments. Although the method steps are described in conjunction with the multi-material structure of FIGS. 1 and 2, persons skilled in the art will understand that fabrication of any multi-material structure with the method steps, in any order, is within the scope of the embodiments. Further, persons skilled in the art will understand that any suitable computer-aided manufacturing system configured to perform the method steps, in any order, is within the scope of the embodiments. An embodiment of one such system is described below in conjunction with FIG. 9.

Prior to the method steps, a geometry of multi-material structure 100 is determined. Thus, the relative locations of each material component of multi-material structure 100 is specified, for example via a conventional NURBS. The geometry that is determined may be based on various functional requirements and design constraints, and may be generated manually via a computer-aided design package, a generative design process, or any other technically feasible design generation process. In some embodiments, the conventional NURBS includes a network of geometry control points that define the shape of one or more component surfaces and/or geometries in 3D space. An embodiment of one such NURBS is described below in conjunction with FIGS. 5 and 6.

Figure 5:
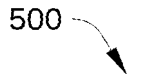
FIG. 5 is a tabular representation of a non-uniform rational B-spline (NURBS) that defines the geometry of a multi-material structure, according to various embodiments.
Figure 6:
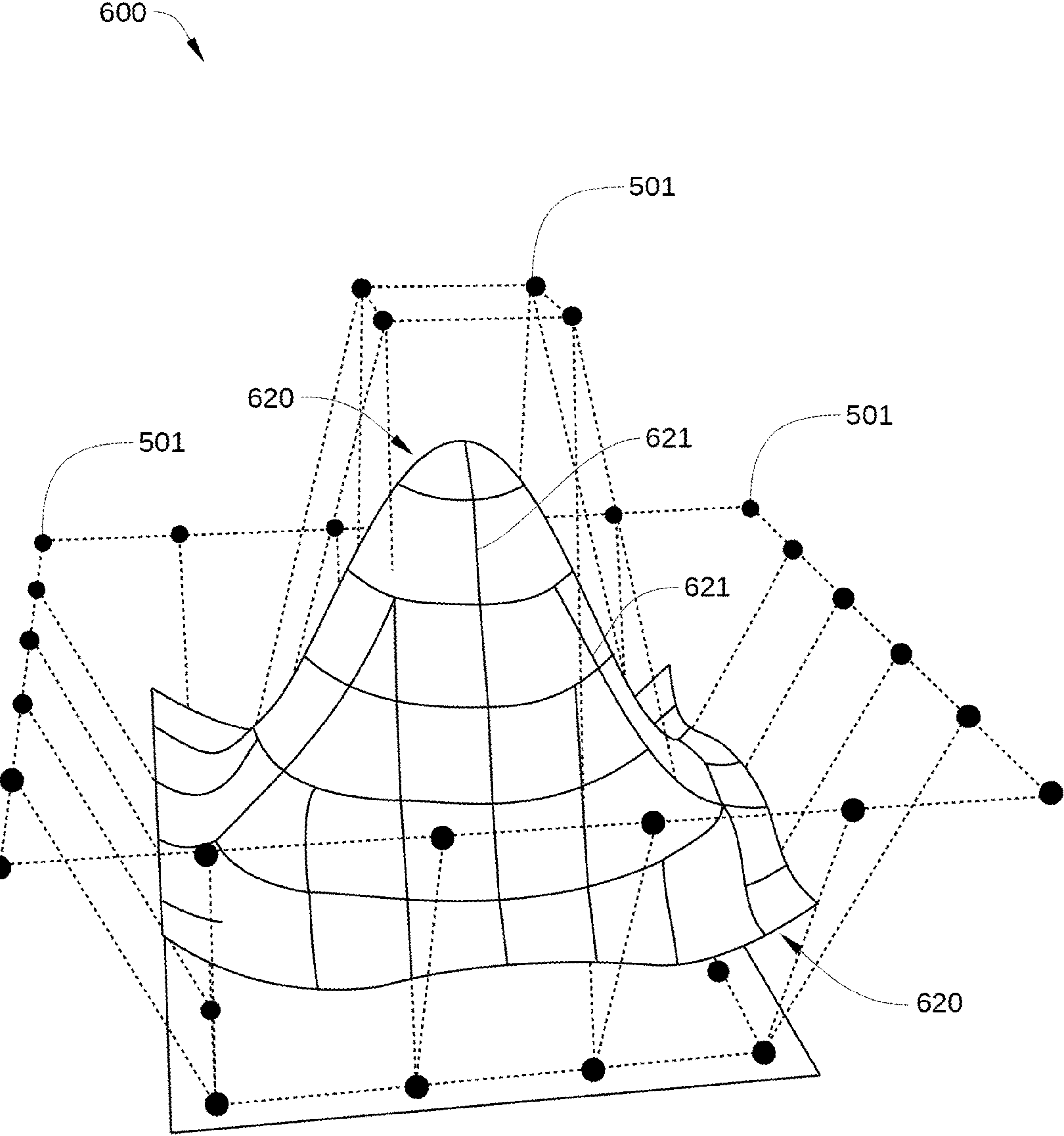
FIG. 6 is a graphical representation of the NURBS of FIG. 5 and the associated geometry defined thereby, according to various embodiments.

FIG. 5 is a tabular representation 500 of a NURBS that defines the geometry of a multi-material structure, according to various embodiments. FIG. 6 is a graphical representation 600 of the NURBS and the associated geometry defined thereby, according to various embodiments. As shown in FIG. 5, tabular representation 500 of the NURBS includes information associated with a plurality of geometric control points 501 that are each positioned in 3D space (as shown in FIG. 6). Thus, for each geometric control point 501, there is an x-location value 511, a y-location value 512, and a z-location value 513 in tabular representation 500, which together indicate the geometric position in 3D space for that geometric control point 501. In some embodiments, tabular representation 500 of the NURBS includes information regarding the order of the polynomial used to describe the NURBS. In addition, for each geometric control point 501, tabular representation 500 includes a value 502 for a knot vector (which generally ranges from 0 to 1) and a weight 503. The value 502 for the knot vector and the value 503 for the weight affect the position of a surface 620 (shown in FIG. 6) in 3D space that is defined by the NURBS, where surface 620 can be a surface of a particular component of a multi-material structure, such as endoskeleton 120, polymeric skin 130, and the like. In particular, the value 502 for the knot vector and the value 503 for the weight cause surface 620 to be attracted to or repelled from the associated control point. In some instances, surface 620 is referred to as a u,v domain (represented by a grid 621) of the NURBS that is defined in a 2D parametric space.

Returning to FIG. 3, prior to the method steps, values for various process parameters for the fabrication of multi-material structure 100 are determined. According to various embodiments, via an extended NURBS, values for the various process parameters are associated with specific geometric locations that are included in the defined geometry for multi-material structure 100. Thus, at each specific geometric location associated with a particular component of multi-material structure 100, the process for generating that particular component of multi-material structure 100 is defined. For example, for polymeric skin 130, at each specific geometric location, values are defined for process parameters such as nozzle velocity, nozzle orientation, deposition temperature, nozzle acceleration, material flow rate, air gap between the nozzle and the substrate or receiving surface, and the like. The process parameters can then be converted to computer-numerical-control (CNC) commands for the fabrication of the structure, such as G-code or any other suitable CNC programming language.

It is noted that the data structure that includes the conventional NURBS and the extended NURBS defines both the geometry of polymeric skin 130 and a specific process for manufacturing polymeric skin 130. For example, the specific process can be optimized or otherwise configured for the geometry of polymeric skin 130. Such a process can include nozzle velocities, nozzle trajectories, deposition temperatures, and the like that avoid process-related flaws in polymeric skin 130, such as delamination, poorly formed radii, collapsed structures (due to lack of supporting material), and the like. Furthermore, in some embodiments, such a process can include nozzle velocities and/or nozzle trajectories that result in a targeted orientation of reinforcing fibers included in polymeric skin 130. This is because reinforcing fibers are known to substantially align with the direction of travel of a 3D printing nozzle. Thus, the process defined by embodiments of the extended NURBS described herein enables the incorporation of the anisotropic properties of 3D-printed polymers into multi-material structure 100. By contrast, conventional computer-aided-manufacturing systems receive the geometrical information for a multi-material structure that is to be fabricated, for example from a digital model of the structure that can be similar to the conventional NURBS described above. Conventional computer-aided-manufacturing systems then perform an automated generation of CNC commands for the fabrication of the structure. For example, G-code operations for controlling a 3D-printing process can be automatically generated based on the geometrical information for the structure, and typically involve slicing the structure into a plurality of layers to be formed sequentially in an automated 3D-printing process. Such a process is inherently unable to tailor process parameters for the 3D-printing process to a specific geometry, and instead selects values for process parameters, such as nozzle velocities and trajectories, that are optimal for the formation of the sequence of layers used to generate the structure. Thus, conventional approaches are unable to perform 3D-printing processes in which process parameters are tailored to the geometry of a specific structure; instead, the process parameters are adjusted based on the geometry of a specific slice of the structure.

Figure 7:
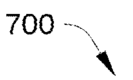
FIG. 7 is a tabular representation of an extended NURBS that defines a fabrication process for a multi-material structure, according to various embodiments.
Figure 8:
FIG. 8 is a graphical representation of the extended NURBS of FIG. 7 and the geometry associated with the multi-material structure of FIG. 7, according to various embodiments.
Figure 8:
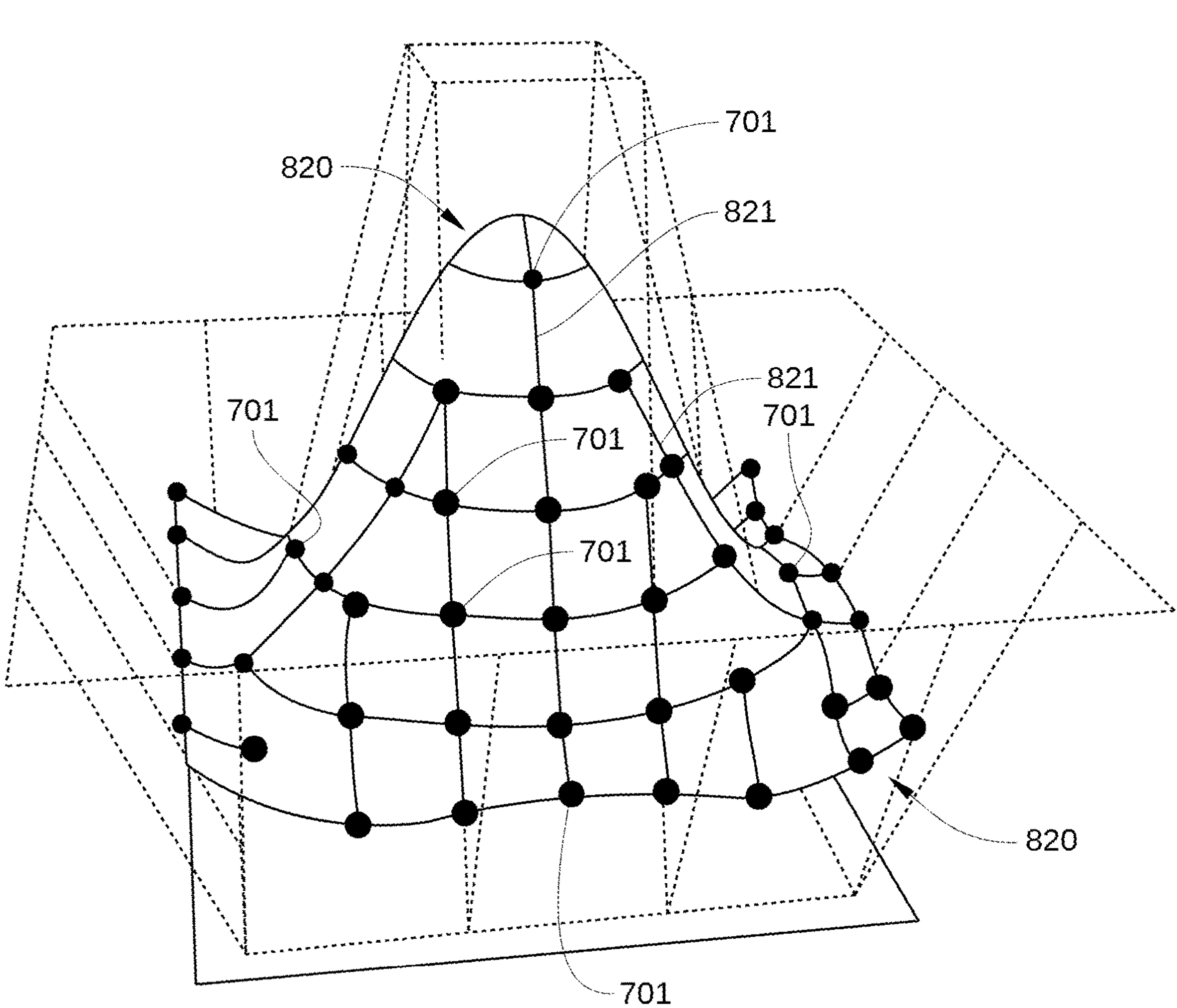

FIG. 7 is a tabular representation 700 of an extended NURBS that defines a fabrication process for a multi-material structure, according to various embodiments. FIG. 8 is a graphical representation 800 of the extended NURBS and a geometry 820 of the multi-material structure, according to various embodiments. As shown in FIG. 7, tabular representation 700 of the NURBS includes information associated with a plurality of process parameter control points 701 that are each positioned in 3D space (as shown in FIG. 8). More specifically, each of the plurality of process parameter control points 701 is positioned on geometry 820, which is disposed in 3D space. Thus, for each process parameter control point 701, there is an x-location value 711, a y-location value 712, and a z-location value 713 in tabular representation 700, which together indicate the geometric position in 3D space for that process parameter control point 701. It is noted that each process parameter control point 701 is constrained to be disposed on or within geometry 820, thereby enabling specific process parameter values to be associated with each location on or within geometry 820.

In some embodiments, tabular representation 700 of the extended NURBS includes information regarding the order of the polynomial used to describe the extended NURBS. In addition, for each process parameter control point 701, tabular representation 700 includes a value 702 for a knot vector, a weight 703, and a value 720 for each of N process parameters. The value 702 for the knot vector and the value 703 for the weight cause a surface (not shown) in a parametric space to be attracted to or repelled from the associated process parameter control point 701. Unlike geometry 820, which defines a geometry in 3D space, the surface in parametric space cannot be graphically visualized relative to geometry 820. However, the shape of the surface in parametric space can define values for process parameters. Thus, for specific locations disposed on or within geometry 820, there is an associated value for each of N process parameters. Examples of the N process parameters include deposition nozzle velocity and acceleration, deposition temperature, material flow rate, air gap between the deposition nozzle and the receiving surface, and the like. In some embodiments, the values for such defined process parameters can influence the shape of the extended NURBS and indicate to a designer that a specified geometrical shape of a structure may not be readily manufactured due to specific features, such as radii that are too small or a ramp that is too severe for a particular material being deposited. For example, based on such an indication provided by process parameters included in the extended NURBS, the designer may modify the specified geometrical shape to be more readily manufacturable. Thus, in such embodiments, values for the defined process parameters may be selected based on a specific material included in polymeric skin 130 and on the specified geometry of polymeric skin 130 to be formed.

Figure 4A:
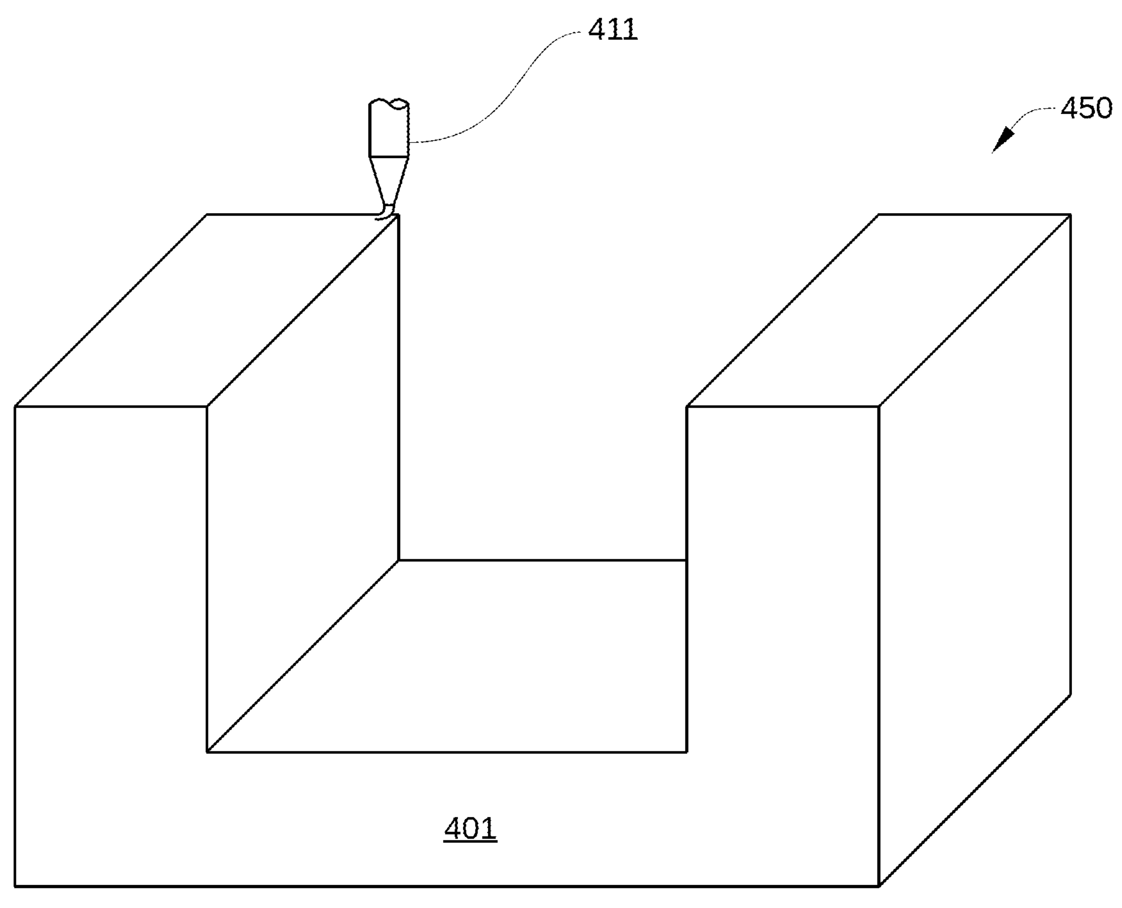
FIGS. 4A-4G depict the fabrication of a multi-material structure, according to various embodiments.

Returning to FIG. 3, a computer-implemented method 300 begins at step 301, where a base 401 is formed for a fabrication assembly 450, as shown in FIG. 4A. Fabrication assembly 450 enables fabrication of multi-material structure 100, for example by supporting portions of polymeric skin 130 that would otherwise collapse. In the embodiment illustrated in FIG. 4A, an end effector 411 (such as a 3D printing nozzle) of a computer-aided-manufacturing system (not shown) deposits a plurality of layers of material to form base 401.

Generally, the deposition nozzle trajectory, material flowrate, and/or other process parameters are implemented via CNC commands or CNC machine code, such as G-code. In some embodiments, base 401 is formed via a conventional 3D-printing process, for example via FDM. Therefore, in such embodiments, the motions and other actions of end effector 411 are controlled by CNC commands that are generated by a conventional machine code generator. As noted previously, a conventional machine code generator automatically converts the 3D geometry of an object to be 3D printed (e.g., base 401) into a usually vertical stack of contour slices and generates machine code suitable for following the trajectories associated with the formation of such contour slices. Alternatively, in some embodiments, base 401 is formed via a 3D-printing process that employs values for process parameters included in an extended NURBS for multi-material structure 100. In such embodiments, the CNC commands that cause end effector 411 to form base 401 are generated from end effector trajectories, material flowrate values, and other process parameters that are included in the extended NURBS. Thus, such CNC commands are not generated by a conventional machine code generator.

Because base 401 is ultimately sacrificed in the fabrication of multi-material structure 100, the specific material used for base 401 generally may have few structural or strength constraints. Instead, the specific material used for base 401 may be selected based on factors that facilitate fabrication of multi-material structure 100. For example, in some embodiments, a material for base 401 is selected based on adhesion to the material used for polymeric skin 130 and/or a surface roughness that may affect the surface roughness of polymeric skin 130.

Figure 4B:
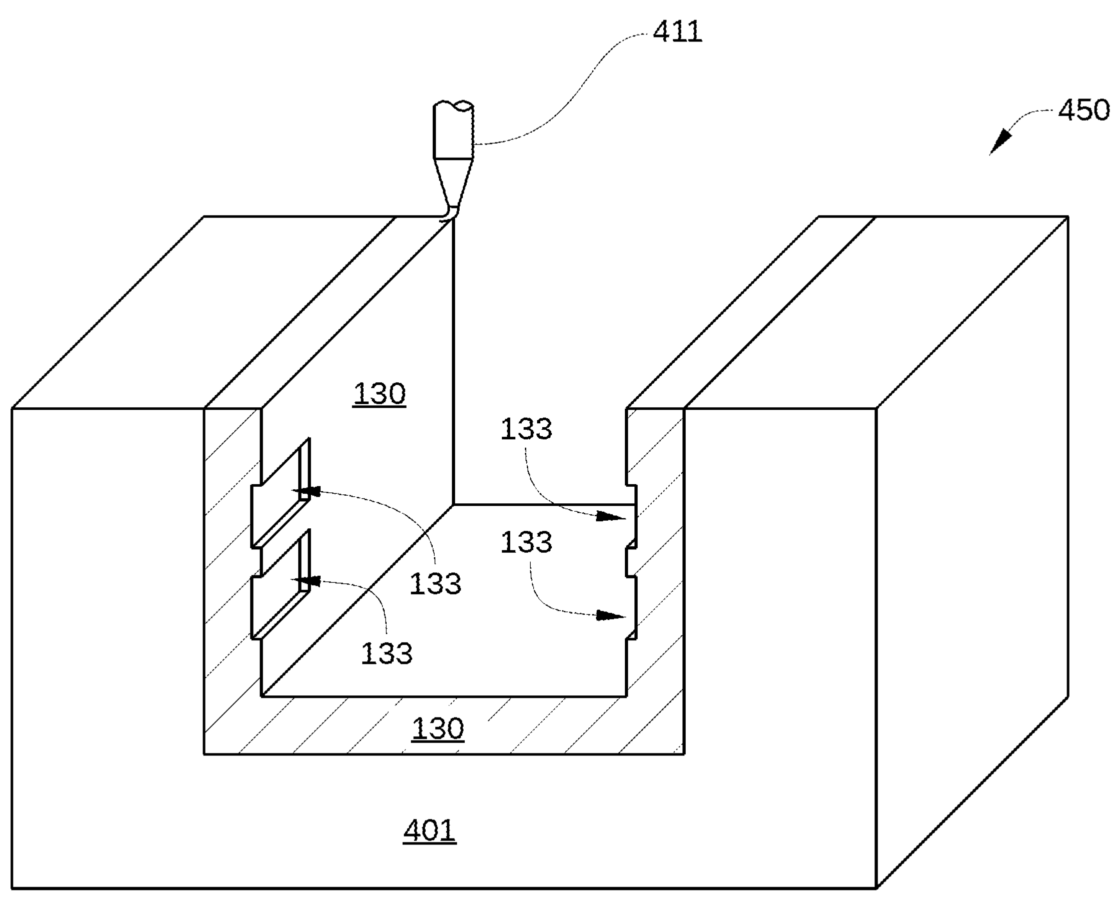

In step 302, polymeric skin 130 for one or more blind surfaces of endoskeleton 120 are deposited, as shown in FIG. 4B. In some embodiments, a blind surface of endoskeleton 120 is a surface of endoskeleton 120 that may not accessible while a portion of polymeric skin 130 is being deposited on another surface of endoskeleton 120. In some embodiments, a blind surface can be a surface of endoskeleton 120 that does not include an open-cell void 123. In some embodiments, polymeric skin 130 is formed to include one or more closed-cell voids 133 on exposed surfaces 406. Thus, in such embodiments, closed-cell voids 133 are not yet completely closed, because endoskeleton 120 is not yet positioned adjacent to exposed surfaces 406.

Figure 4C:
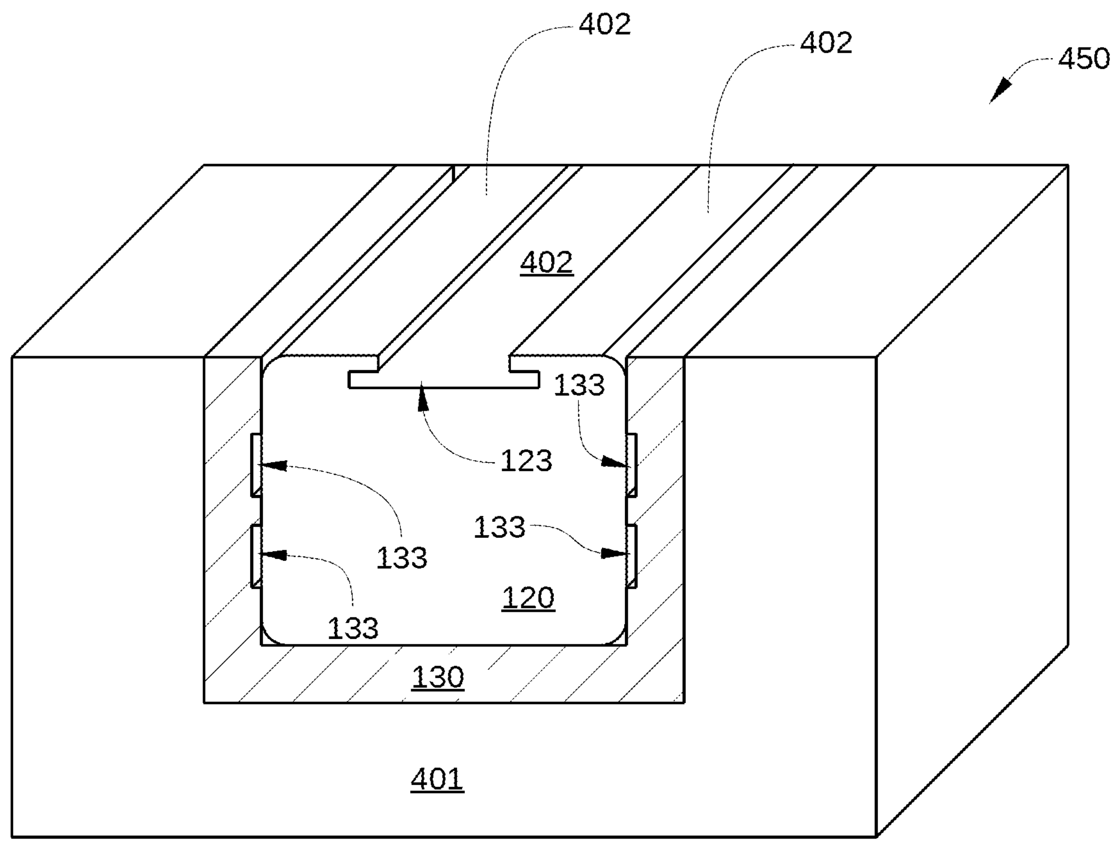

In step 303, endoskeleton 120 is inserted into base 401 of fabrication assembly 450, as shown in FIG. 4C. Endoskeleton 120 is fabricated in step 311 as described below. When endoskeleton 120 is inserted into base 401, a top surface 402 is exposed as shown, and closed-cell voids 133 are fully enclosed voids.

Figure 4D:
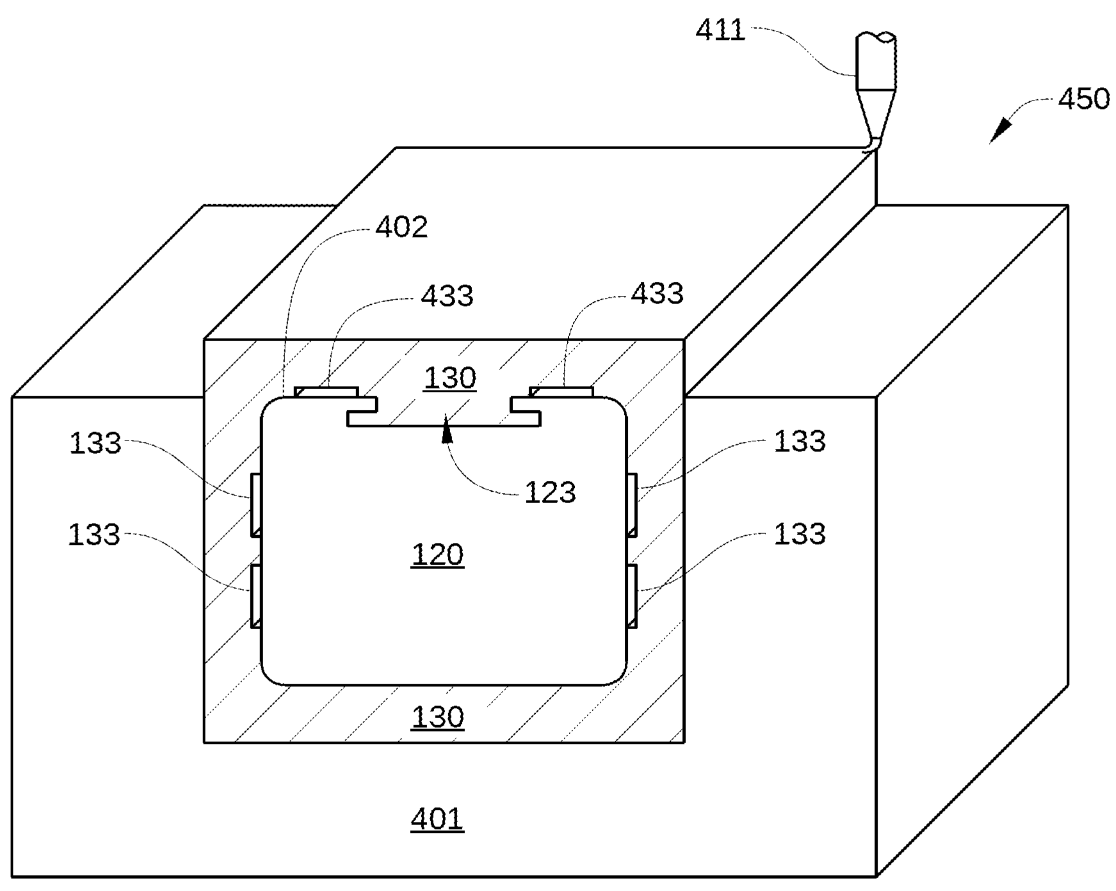

In step 304, a portion of polymeric skin 130 is deposited on exposed surface 402 of endoskeleton 120, as shown in FIG. 4D. In the embodiment illustrated in FIG. 3, top surface 402 includes one or more open-celled voids 123, and therefore a first portion of polymeric skin 130 is deposited within the one or more open-cell voids 123 and a second portion of polymeric skin 130 is deposited on top surface 402. As shown, in the embodiment illustrated in FIG. 4D, the first portion of polymeric skin 130 and the second portion of polymeric skin 130 are contiguous and form a single continuous polymeric layer. In some embodiments, in step 304, one or more closed-cell voids 433 are formed between top surface 402 and polymeric skin 130 by selectively depositing the first portion of polymeric skin 130 around the locations of the one or more closed-cell voids 433.

In step 304, end effector 411 of a computer-aided manufacturing system forms the first portion of polymeric skin 130 that is deposited within open-cell voids 123 and the second portion of polymeric skin 130 that is deposited on exposed surface 402. The end effector 411 forms the first portion and the second portion of polymeric skin 130 based on process parameter values included in an extended NURBS similar to the extended NURBS described in conjunction with FIGS. 7 and 8. Thus, the CNC commands that cause end effector 411 to form polymeric skin 130 are generated from end effector trajectories, material flowrate values, and/or other process parameters that are included in the extended NURBS.

In some embodiments, trajectories of a deposition nozzle associated with end effector 411 are parallel to stress-strain lines determined to exist within polymeric skin 130 when multi-material structure 100 is under a specified load. Therefore, reinforcing fibers included in polymeric skin 130 are aligned substantially parallel with such stress-strain lines, thereby increasing the effectiveness of the fiber reinforcement. In such embodiments, the stress-strain lines can be determined via finite-element analysis of a 3D model of multi-material structure 100, where each element included in such analysis can have a stress tensor direction associated therewith. Thus, the stress tensor direction for a particular portion of polymeric skin 130 that is associated with an analytical element indicates an ideal deposition nozzle trajectory when material corresponding to that particular portion of polymeric skin 130 is being deposited.

Figure 4E:
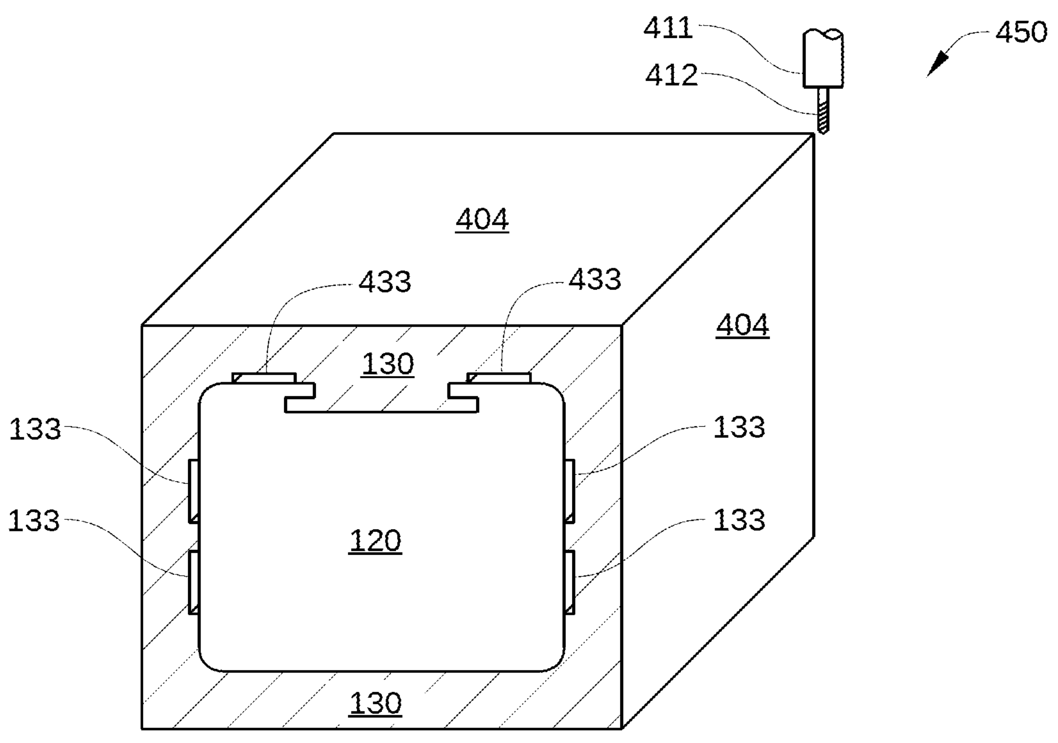

In step 305, material for base 401 is removed from fabrication assembly 450, as shown in FIG. 4E. For example, in some embodiments, an NC cutting tool 412 associated with end effector 411 can be employed to remove base 401. In some embodiments, values for the trajectory and other process parameters of NC cutting tool 412 can be based on process parameter values included in an extended NURBS similar to the extended NURBS described in conjunction with FIGS. 7 and 8. Upon removal of base 401, surfaces 404 of polymeric skin 130 are exposed.

In step 306, one or more surfaces 404 of polymeric skin 130 are finished or otherwise modified. For example, in some embodiments, a suitable NC cutting tool or other processing instrument (not shown) can be employed to achieve a specified target surface roughness or smoothness of polymeric skin 130. In some embodiments, values for the trajectory and other process parameters of the NC cutting tool can be based on process parameter values included in an extended NURBS similar to the extended NURBS described in conjunction with FIGS. 7 and 8.

Figure 4F:
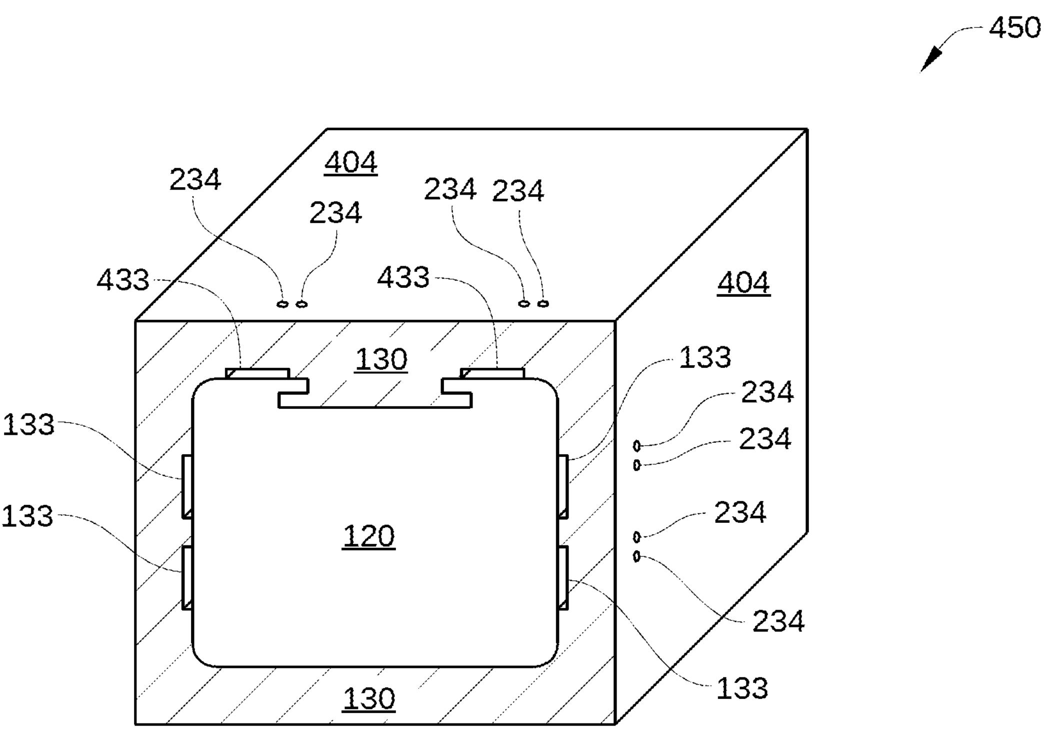
Figure 4G:
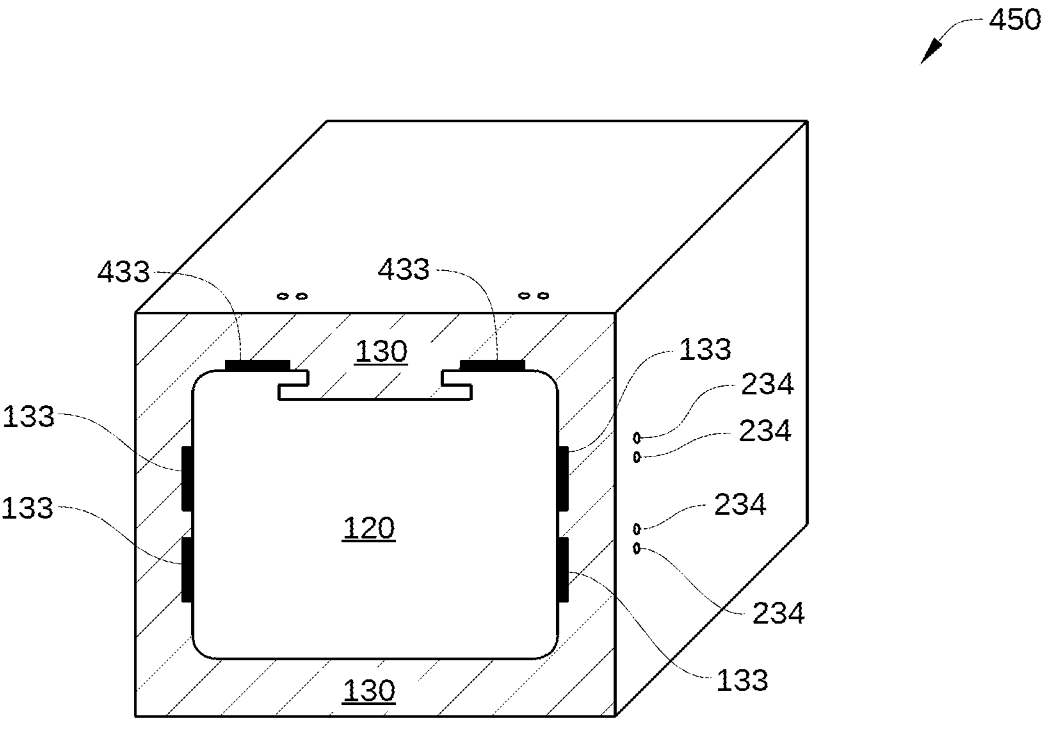

In step 307, injection holes 234 are formed in polymeric skin 130 for the subsequent injection of adhesive, as shown in FIG. 4F. In some embodiments, injection holes 234 are microholes drilled via an NC machine. In step 308, a suitable adhesive is injected into closed-cell voids 133 and closed-cell voids 433 via injection holes 234, as shown in FIG. 4G.

In step 309, an infiltration process may be employed in some embodiments to further strengthen polymeric skin 130. In such embodiments, microscopic voids that are known to exist within most polymers are filled with a suitable resin, so that the polymeric material is less brittle. In some embodiments, the infiltration process includes applying a suitable resin on an outer surface of polymeric skin 130 via a suitable process, for example via a vacuum-bag or pressure-back process. For example, in some embodiments, multi-material structure 100 is wrapped in a plastic bag, vacuum is applied to the interior of the bag so that the bag is drawn against the outer surface of polymeric skin 130, and a suitable resin is inserted into the bag. Suitable process parameters for such an infiltration process can vary based on multiple factors, including the material(s) included in polymeric skin 130, the thickness of polymeric skin 130, the anticipated application of multi-material structure 100 (such as chemical exposure, intensity of impact, etc.), and the like. Examples of process parameters for such an infiltration process can include type of resin, duration of vacuum pressure application, process temperature, and the like. Method 300 then proceeds to step 320 and terminates.

In step 311, endoskeleton 120 is formed. As described above, endoskeleton 120 can be formed via any technically feasible manufacturing technique or techniques, such as extrusion, pultrusion, rolling, bending, welding, forging, stamping, and/or the like.

Exemplary Computing-Aided Manufacturing System

Figure 9:
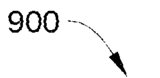
FIG. 9 illustrates a computer-numerical-control processing system configured to implement one or more aspects of the various embodiments.
Figure 9:
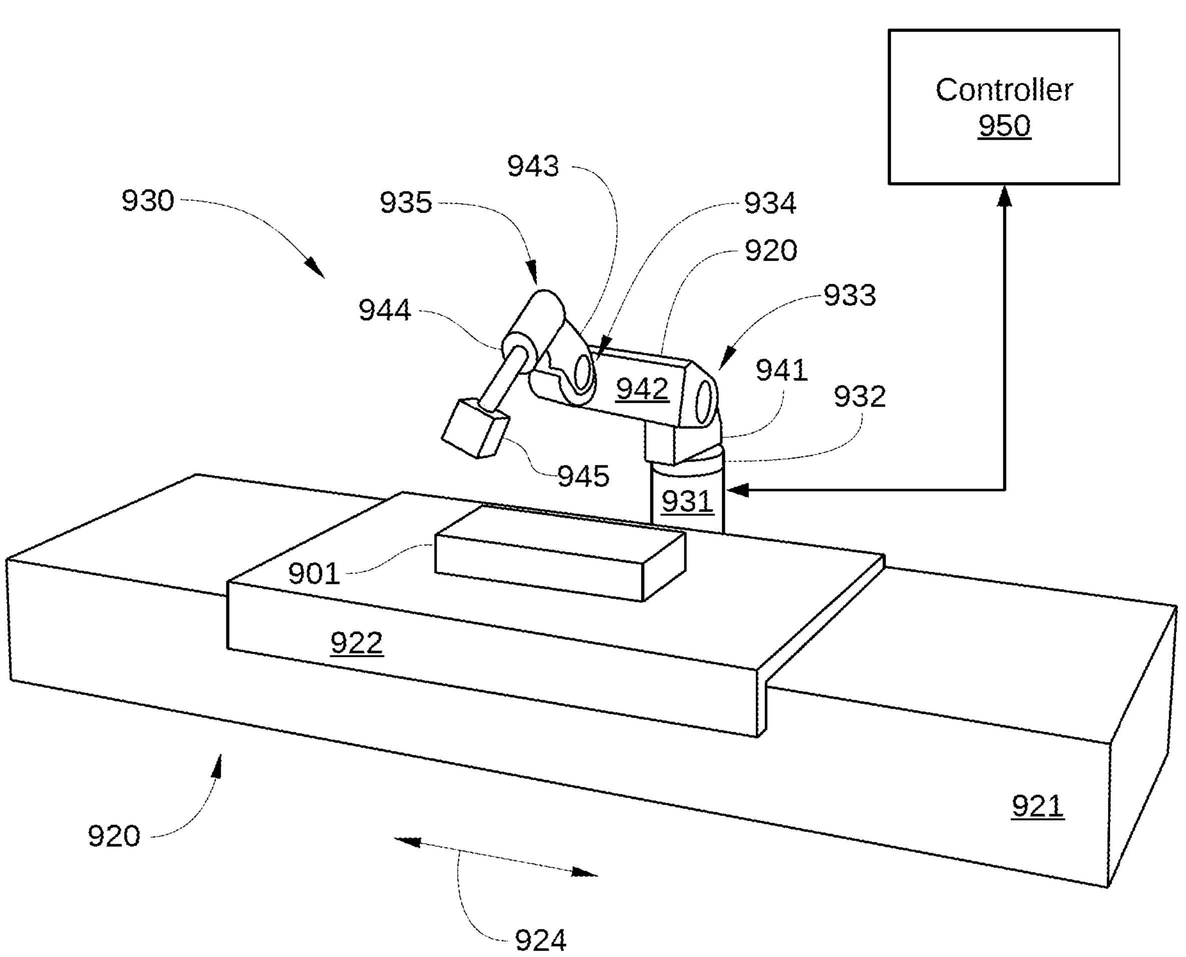

FIG. 9 illustrates a CNC processing system 900 configured to implement one or more aspects of the various embodiments. CNC processing system 900 can be any computer-controlled workpiece processing system, such as a machining system (mill, lathe, drill, and/or the like), an array of multiple such machining systems, a three-dimensional (3D) printer, a laser-engraving machine, and the like. As such, CNC processing system 900 is configured to perform one or more precise and repeatable processes on a workpiece 901, including material addition (e.g., 3D printing), material removal, surface texturization and/or functionalization, and coating application, among others. In the embodiment illustrated in FIG. 9, CNC processing system 900 a table 920, a CNC positioner 930 and a controller 950.

Table 920 supports workpiece 901 during processing and, in the embodiment illustrated in FIG. 9, includes a base 921 and a movable stage 922 on which workpiece 901 is disposed. In some embodiments, movable stage 922 provides motion of workpiece 901 relative to positioner 930 along a single axis 924. In other embodiments, movable stage 922 provides motion of workpiece 901 relative to positioner 930 along a multiple axes, such as an XY or XYZ stage.

CNC positioner 930 is a multi-axis positioning apparatus, such as a polar axis machine, that locates and orients end effector 945 in two or three dimensions with respect to workpiece 901. For example, in embodiments in which end effector 945 includes a 3D-printing nozzle, CNC positioner 930 sequentially moves the 3D-printing nozzle along specific trajectories over surfaces of workpiece 901. Thus, in such embodiments, discrete portions of added material can be applied to one or more surfaces of workpiece 901 in a specified order. In other embodiments, CNC positioner 930 can be any technically feasible system for positioning end effector 945, such as a Cartesian positioner or a hybrid polar and Cartesian positioner.

In the embodiment illustrated in FIG. 9, CNC positioner 930 includes base 931, a first axis 932, a second axis 933, a third axis 934 and a fourth axis 935. In some embodiments, CNC positioner 930 can further include a fifth and sixth axis (not shown for clarity). CNC positioner 930 further includes a first arm 941 that is coupled to base 931 via first axis 932, a second arm 942 that is coupled to first arm 941 via second axis 933, a third arm 943 that is coupled to second arm 942 via third axis 934, a fourth arm 944 that is coupled to third arm 943 via fourth axis 935, and end effector 945, which is coupled to fourth arm 944. In other embodiments, CNC processing system 900 includes more or fewer arms and/or joints than those shown in FIG. 9. Further, in some embodiments, CNC positioner 930 can have any other technically feasible multi-axis configuration, such as a Cartesian robot configuration. In some embodiments, base 931 is fixed in position relative to workpiece 901, for example to a supporting surface (not shown). In other embodiments, base 931 is configured to move relative to workpiece 900, for example in two or three dimensions.

End effector 945 is configured to perform one or more processes on workpiece 901, such as material removal (e.g., milling, drilling, and/or lathe operations), material addition (e.g., 3D printing), surface texturization and/or surface functionalization (e.g., via laser ablation), and the like. For example, in some embodiments, end effector 945 includes one or more motorized tools that are controlled based on machine control instructions for a specific process to be performed on workpiece 901. Alternatively or additionally, in some embodiments, end effector 945 includes a 3D-printing deposition nozzle.

Controller 950 controls the operations of CNC processing system 900. In some embodiments, controller 950 receives user inputs and/or a 3D model for a particular workpiece 901 via a human-machine interface (not shown). In some embodiments, controller 950 is further configured to generate and execute a sequential program of machine control instructions (e.g., G-code and/or M-code) based on the 3D model. Alternatively or additionally, in some embodiments, the 3D model includes a suitable sequential program of machine control instructions that are generated via computer-aided design (CAD) or computer-aided manufacturing (CAM) software by a computing device external to CNC processing system 900. Further, in some embodiments, controller 950 is configured to generate suitable machine control instructions based on one or more process parameter values included in an extended NURBS. In such embodiments, each of the one or more process parameter values are associated with specific geometric locations disposed within and/or on a surface of a component being processed by CNC processing system 900.

Exemplary Computing Device

Figure 10:
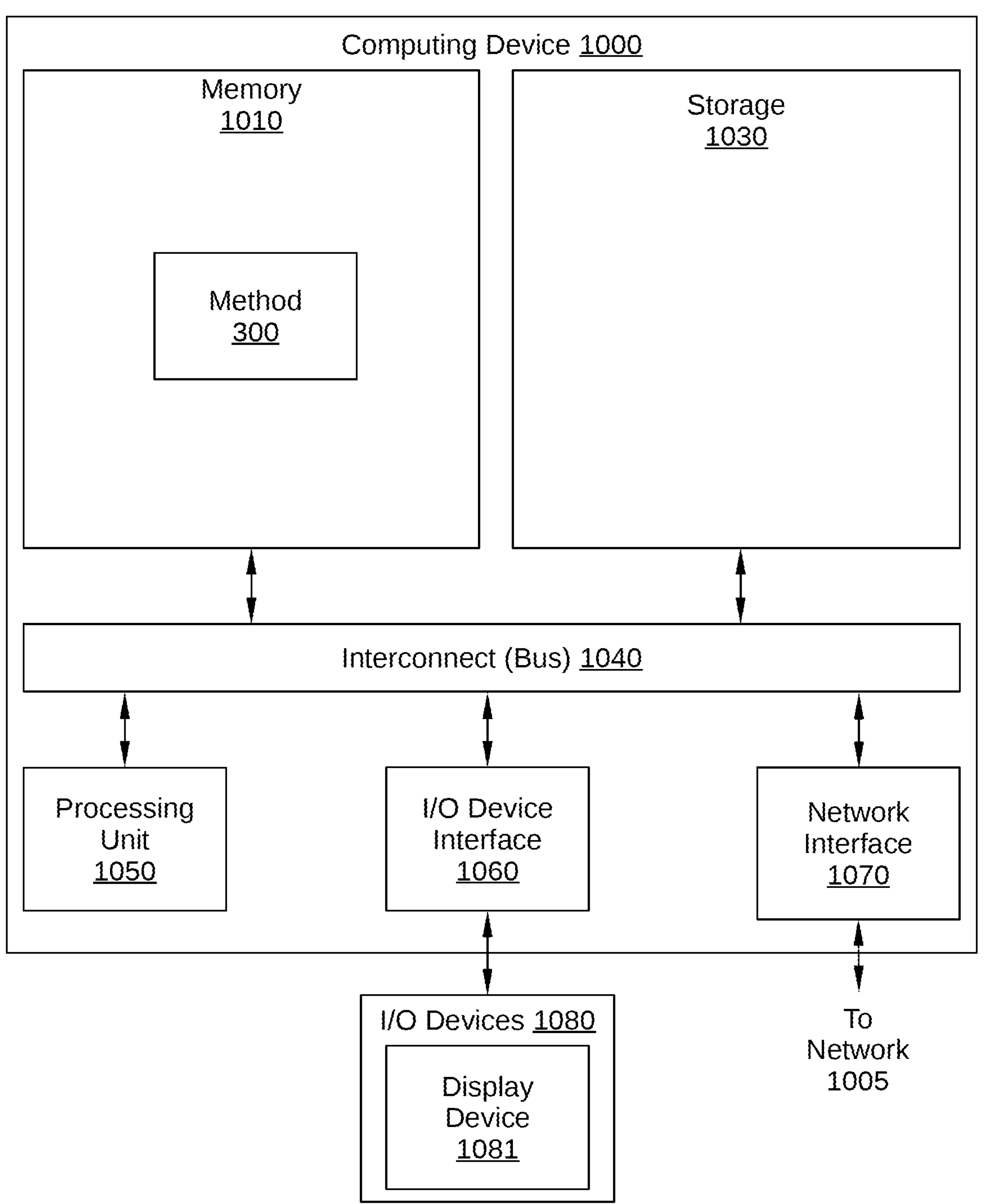
FIG. 10 is a block diagram of a computing device configured to implement one or more aspects of the various embodiments.

FIG. 10 is a block diagram of a computing device 1000 configured to implement one or more aspects of the various embodiments. Thus, computing device 1000 can be a computing device associated with a CNC processing system, such as CNC processing system 900. Computing device 1000 may be a desktop computer, a laptop computer, a tablet computer, or any other type of computing device configured to receive input, process data, generate control signals, and display images. Computing device 1000 is configured to perform operations associated with method 300 and/or other suitable software applications, which can reside in a memory 1010. It is noted that the computing device described herein is illustrative and that any other technically feasible configurations fall within the scope of the present disclosure.

As shown, computing device 1000 includes, without limitation, an interconnect (bus) 1040 that connects a processing unit 1050, an input/output (I/O) device interface 1060 coupled to input/output (I/O) devices 1080, memory 1010, a storage 1030, and a network interface 1070. Processing unit 1050 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 1050 may be any technically feasible hardware unit capable of processing data and/or executing software applications, including processes associated with method 300. Further, in the context of this disclosure, the computing elements shown in computing device 1000 may correspond to a physical computing system (e.g., a system in a data center) or may be a virtual computing instance executing within a computing cloud.

I/O devices 1080 may include devices capable of providing input, such as a keyboard, a mouse, a touch-sensitive screen, and so forth, as well as devices capable of providing output, such as a display device 1081. Additionally, I/O devices 1080 may include devices capable of both receiving input and providing output, such as a touchscreen, a universal serial bus (USB) port, and so forth. I/O devices 1080 may be configured to receive various types of input from an end-user of computing device 1000, and to also provide various types of output to the end-user of computing device 1000, such as one or more graphical user interfaces (GUI), displayed digital images, and/or digital videos. In some embodiments, one or more of I/O devices 1080 are configured to couple computing device 1000 to a network 1005.

Memory 1010 may include a random access memory (RAM) module, a flash memory unit, or any other type of memory unit or combination thereof. Processing unit 1050, I/O device interface 1060, and network interface 1070 are configured to read data from and write data to memory 1010. Memory 1010 includes various software programs that can be executed by processor 1050 and application data associated with said software programs, including method 300.

In sum, the various embodiments described herein provide techniques for fabricating a multi-material structure that behaves as a monolithic structure or member. In some embodiments, the multi-material structure includes an endoskeleton and a polymeric skin. The endoskeleton has one or more open-cell voids on an outer surface, and the polymeric skin is formed on the outer surface and within the one or more open-cell voids. In some embodiments, a data structure that includes an extended NURBS enables fabrication of the multi-material structure by indicating values for one or more process parameters at various geometric locations within the multi-material structure. In particular, the process parameters can be associated with deposition of the polymeric skin.

At least one technical advantage of the disclosed techniques relative to the prior art is that the disclosed techniques enable the fabrication of a multi-material structure that has improved mechanical coupling between different materials included in the muti-material structure relative to what can be achieved using conventional techniques. Consequently, the multi-material structures generated using the disclosed techniques behave mechanically as single monolithic members instead of collections of separate discrete elements. Another technical advantage of the disclosed techniques is that 3D-printed polymers can be deposited or formed with predictable physical properties. Consequently, when generating a multi-material structure using the disclosed techniques, anisotropic, 3D-printed polymers can be formed and oriented to enhance the strength and/or rigidity of the multi-material structure relative to what can be achieved using conventional techniques. These technical advantages provide one or more technological advancements over prior art approaches.

1. In some embodiments, a method for fabricating a multi-material structure includes: forming a structural member with at least one open-cell void that is formed on a surface of the structural member; depositing a first portion of a polymeric skin on the surface; and depositing a second portion of the polymeric skin within the at least one open-cell void.

2. The method of clause 1, wherein depositing the polymeric skin comprises moving a deposition nozzle along a trajectory indicated by values stored in a data structure that includes an extended non-uniform, rational B-spline (NURBS).

3. The method of clauses 1 or 2, wherein the extended NURBS includes control points that are positioned within 3D space to correspond with a location of the polymeric skin.

4. The method of any of clauses 1-3, wherein machine code that incorporates the values stored in the data structure is executed to move the deposition nozzle along the trajectory.

5. The method of any of clauses 1-4, wherein the polymeric skin is deposited in accordance with one or more deposition process parameter values making up an extended NURBS.

6. The method of any of clauses 1-5, wherein the one or more deposition process parameter values are associated with at least one of a trajectory of a deposition nozzle, a velocity of the deposition nozzle, an acceleration of the deposition nozzle, a deposition temperature, a material feed rate, or an air gap between the deposition nozzle and the surface.

7. The method of any of clauses 1-6, wherein the extended NURBS associates one or more values of one or more deposition process parameters with a specific location on the surface.

8. The method of any of clauses 1-7, further comprising: forming a fabrication base prior to depositing the first portion of the polymeric skin on the surface and depositing the second portion of the polymeric skin within the at least one open-cell void; and depositing a third portion of the polymeric skin on at least one surface of the fabrication base.

9. The method of any of clauses 1-8, further comprising removing the fabrication base after depositing the first portion of the polymetric skin and depositing the second portion of the polymetric skin.

10. The method of any of clauses 1-9, wherein the second portion of the polymeric skin is deposited within the at least one open-cell void by filling the at least one open-cell void with the second portion.

11. The method of any of clauses 1-10, wherein the first portion of the polymeric skin is contiguous with the second portion of the polymeric skin.

12. The method of any of clauses 1-11, further comprising forming at least one closed-cell void within the polymeric skin when depositing the first portion of the polymeric skin on the surface.

13. The method of any of clauses 1-12, further comprising: forming at least one injection hole between an outer surface of the polymeric skin and the at least one closed-cell void; and injecting an adhesive into the at least one closed-cell void via the at least one injection hole.

14. The method of any of clauses 1-13, wherein the at least one injection hole includes two or more injection holes that are fluidly coupled to a single closed-cell void.

15. The method of any of clauses 1-4, wherein depositing the first portion of the polymeric skin on the surface comprises moving a deposition nozzle along a trajectory that is aligned with a predicted stress-strain line associated with the first portion of the skin.

16. The method of any of clauses 1-5, further comprising performing an infiltration process on an outer surface of the second portion of the polymeric skin.

17. The method of any of clauses 1-6, further comprising, determining a geometry of the structural member based on one or more deposition process parameter values included in an extended NURBS associated with the structural member.

18. In some embodiments, a method for fabricating a multi-material structure includes: forming a structural member with a surface; forming a polymeric skin on the surface by depositing a first portion of a polymeric material on a first portion of the surface; forming at least one open-cell void on the surface by depositing a second portion of a polymeric material proximate a second portion of the surface; and injecting an adhesive into the at least one closed-cell void.

19. The method of clause 18, further comprising, prior to injecting the adhesive, forming at least one injection hole through the first portion of polymeric material into the at least one closed-cell void.

20. The method of clauses 18 or 19, wherein the at least one open-cell void is partially formed by the surface.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a “module,” a “system,” or a “computer.” In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for fabricating a multi-material structure, the method comprising:

forming a structural member with at least one open-cell void that is formed on a surface of the structural member;

depositing a first portion of a polymeric skin on the surface to form at least one closed-cell void within the polymeric skin, wherein the closed-cell void is formed between an external surface of the structural member and an internal surface of the polymeric skin; and depositing a second portion of the polymeric skin within the at least one open-cell void.

2. The method of claim 1, wherein depositing the polymeric skin comprises moving a deposition nozzle along a trajectory indicated by values stored in a data structure that includes an extended non-uniform, rational B-spline (NURBS).

3. The method of claim 2, wherein the extended NURBS includes control points that are positioned within 3D space to correspond with a location of the polymeric skin.

4. The method of claim 2, wherein machine code that incorporates the values stored in the data structure is executed to move the deposition nozzle along the trajectory.

5. The method of claim 1, wherein the polymeric skin is deposited in accordance with one or more deposition process parameter values making up an extended NURBS.

6. The method of claim 5, wherein the one or more deposition process parameter values are associated with at least one of a trajectory of a deposition nozzle, a velocity of the deposition nozzle, an acceleration of the deposition nozzle, a deposition temperature, a material feed rate, or an air gap between the deposition nozzle and the surface.

7. The method of claim 5, wherein the extended NURBS associates one or more values of one or more deposition process parameters with a specific location on the surface.

8. The method of claim 1, further comprising:

forming a fabrication base prior to depositing the first portion of the polymeric skin on the surface and depositing the second portion of the polymeric skin within the at least one open-cell void; and depositing a third portion of the polymeric skin on at least one surface of the fabrication base.

9. The method of claim 8, further comprising removing the fabrication base after depositing the first portion of the polymeric skin and depositing the second portion of the polymeric skin.

10. The method of claim 1, wherein the second portion of the polymeric skin is deposited within the at least one open-cell void by filling the at least one open-cell void with the second portion.

11. The method of claim 10, wherein the first portion of the polymeric skin is contiguous with the second portion of the polymeric skin.

12. The method of claim 1, wherein the at least one closed-cell void is formed when depositing the first portion of the polymeric skin on the surface.

13. The method of claim 12, further comprising:

forming at least one injection hole between an outer surface of the polymeric skin and the at least one closed-cell void; and injecting an adhesive into the at least one closed-cell void via the at least one injection hole.

14. The method of claim 13, wherein the at least one injection hole includes two or more injection holes that are fluidly coupled to a single closed-cell void.

15. The method of claim 1, wherein depositing the first portion of the polymeric skin on the surface comprises moving a deposition nozzle along a trajectory that is aligned with a predicted stress-strain line associated with the first portion of the polymeric skin.

16. The method of claim 1, further comprising performing an infiltration process on an outer surface of the second portion of the polymeric skin.

17. The method of claim 1, further comprising, determining a geometry of the structural member based on one or more deposition process parameter values included in an extended NURBS associated with the structural member.

18. A method for fabricating a multi-material structure, the method comprising:

forming a structural member with a surface;

forming a polymeric skin on the surface with at least one closed-cell void within the polymeric skin by depositing a first portion of a polymeric material on a first portion of the surface, wherein the closed-cell void is formed between an external surface of the structural member and an internal surface of the polymeric skin;

forming at least one open-cell void on the surface by depositing a second portion of a polymeric material proximate a second portion of the surface; and injecting an adhesive into the at least one closed-cell void.

19. The method of claim 18, further comprising, prior to injecting the adhesive, forming at least one injection hole through the first portion of polymeric material into the at least one closed-cell void.

20. The method of claim 18, wherein the at least one open-cell void is partially formed by the surface.

* * * * *